United States Patent
Lu

(10) Patent No.: US 12,102,913 B2
(45) Date of Patent: Oct. 1, 2024

(54) METHOD FOR IMPLEMENTING MULTI-PLAYER GAMES

(71) Applicant: Garena Online Private Limited, Singapore (SG)

(72) Inventor: Chen Lu, Singapore (SG)

(73) Assignee: Garena Online Private Limited, Singapore (SG)

( * ) Notice: Subject to any disclaimer, the term of this patent is extended or adjusted under 35 U.S.C. 154(b) by 302 days.

(21) Appl. No.: 17/764,802

(22) PCT Filed: Nov. 26, 2021

(86) PCT No.: PCT/SG2021/050727
§ 371 (c)(1),
(2) Date: Mar. 29, 2022

(87) PCT Pub. No.: WO2022/164385
PCT Pub. Date: Aug. 4, 2022

(65) Prior Publication Data
US 2023/0082388 A1    Mar. 16, 2023

(30) Foreign Application Priority Data
Jan. 28, 2021    (SG) .............. 10202100950P

(51) Int. Cl.
*A63F 13/358*    (2014.01)
*A63F 13/25*    (2014.01)
(52) U.S. Cl.
CPC ............ *A63F 13/358* (2014.09); *A63F 13/25* (2014.09)

(58) Field of Classification Search
CPC ....... A63F 13/25; A63F 13/358; A63F 13/837
See application file for complete search history.

(56) References Cited

U.S. PATENT DOCUMENTS

| | | | |
|---|---|---|---|
| 6,415,317 B1 * | 7/2002 | Yelon | A63F 13/30 |
| | | | 719/329 |
| 7,244,181 B2 * | 7/2007 | Wang | G06Q 30/00 |
| | | | 463/42 |
| 8,678,929 B1 * | 3/2014 | Nishimura | A63F 13/798 |
| | | | 463/31 |
| 9,381,432 B2 * | 7/2016 | Justice | A63F 13/355 |
| 9,674,267 B2 * | 6/2017 | Fiedler | A63F 13/577 |
| 11,033,813 B2 * | 6/2021 | Brown | A63F 13/71 |
| 2002/0142843 A1 * | 10/2002 | Roelofs | A63F 13/31 |
| | | | 463/42 |
| 2016/0330493 A1 * | 11/2016 | Chuah | H04N 21/4781 |
| 2021/0046384 A1 * | 2/2021 | Kurabayashi | A63F 13/73 |
| 2021/0146241 A1 * | 5/2021 | Bleasdale-Shepherd | ........ |
| | | | H04L 67/131 |
| 2023/0082388 A1 * | 3/2023 | Lu | A63F 13/358 |
| | | | 463/42 |

\* cited by examiner

*Primary Examiner* — Chase E Leichliter
(74) *Attorney, Agent, or Firm* — David R. Stevens; Stevens Law Group

(57) ABSTRACT

A method wherein a client application on a client device receives a command to perform an action, calculates a consequence of the action and renders the consequence in a first instance of the game is disclosed. A server then receives a data package from the client device, the data package comprising the action and the consequence, determines that the consequence is valid, and disseminates the data package to other client devices, so that client applications in the other client devices can render the consequence in other instances of the game.

14 Claims, 11 Drawing Sheets

| Action | Consequence |
|---|---|
| Move to the left | Avatar is moved to position X |
| Move to the right | Avatar is moved to position Y |
| Move forward | Avatar is moved to position Z |
| Move backward | Avatar is moved to position W |
| Activate weapon | Shot missed target T |
| Activate weapon | Shot hit target T |
| Drive vehicle to the left | Vehicle is driven to position X |
| Drive vehicle to the right | Vehicle is driven to position Y |
| Drive vehicle forward | Vehicle is driven to position Z |
| Drive vehicle backward | Vehicle is driven to position W |
| Weapon Shift | Weapon is changed from Weapon A to Weapon B |

FIGURE 3

| Action | Consequence | Game-altering impact |
|---|---|---|
| Move to the left | Avatar is moved to position X | Decrease avatar's health by 10 hit points |
| Activate weapon | Shot missed target T | None |
| Activate weapon | Shot hit target T | Decrease target T's health by 20 hit points |
| Drive vehicle to the left | Vehicle is driven to position X | Decrease target T's health by 30 hit points |
| Drive vehicle to the right | Vehicle is driven to position Y | None |
| Weapon Shift | Weapon is changed from Weapon A to Weapon B | None |

FIGURE 6

TIMESTAMP 2

METHOD FOR IMPLEMENTING MULTI-PLAYER GAMES

FIELD OF THE INVENTION

The invention pertains to multi-player games, and in particular, first person shooter (FPS) online multiplayer games.

BACKGROUND

When playing an online multi-player first person shooter (FPS) game, all actions (moving, activating weapon, driving a vehicle) has a consequence (e.g. avatar is moved to position X, hit or missed target T, vehicle is driven to position X).

The traditional way of implementing online multi-player FPS games is that all action-consequence pairs need to be verified by a server, before the consequence of the action can be rendered in the game. This is to prevent cheating or to mitigate any dishonest behavior. For example, if a player provides the command to perform the action "move to the left", (1) a data package will have to be sent to the server. (2) From the content of the data package, the server then determines that the consequence of the action is "avatar is moved to position X". (3) The server then sends the consequence of the action to the client device. (4) Upon receipt, the client device then renders the consequence in the game.

In other words, in the traditional method, the server has to determine the consequence of the action, and provide the consequence to the client device, before the consequence can be rendered on the client device. This scheme suffers from certain disadvantages. Firstly, the time taken to complete steps (1) to (4) can result in high latency in the game. This is because even though the action has already been performed by the player, the result or consequence of said action can only be rendered in the game on the client device after steps (1) to (4) have been completed. Therefore, steps (1) to (4) and any delay of said steps can result in intermittent pauses and jerky gameplay, which can have a negative effect on user experience.

Furthermore, in the traditional method, in order to compute the consequence of every action, a vast number of data packages will have to be sent from the client device to the server, constantly, and at very high frequencies. This leads to extremely high data transfers which will consume a lot of data and bandwidth. The problem is compounded especially in mobile gameplay where players will typically rely on data subscriptions which has a monthly data cap and have limited network bandwidth.

Therefore, what is required is a novel method for implementing multi-player games which addresses the above problems by reducing latency and improving responsiveness of the game to enhance the user experience, while still being robust enough to mitigate cheating. The method should also ideally reduce the amount and frequency of data transfers between the client device and the server to save on data transfer costs for the player. Furthermore, other desirable features and characteristics will become apparent from the subsequent detailed description and the appended claims, taken in conjunction with the accompanying drawings and this background of the disclosure.

SUMMARY OF INVENTION

According to an aspect of the invention, a method for implementing a multi-player game is disclosed, the method comprising the steps of launching by a first client application on a first client device, a first instance of the multi-player game; receiving at the first client application, a command to perform an action; calculating at the first client application, a consequence of the action; and rendering by the first client application, the consequence in the first instance of the multi-player game.

The method further comprises the steps of determining by the first client application, that the consequence has a game-altering impact; sending a data package from the first client device to a server, the data package comprising the action, the consequence and the game-altering impact; receiving by the server, the data package; determining by the server, that the consequence is valid; determining by the server, that the game-altering impact is valid; and disseminating by the server, the data package to other client devices, so that client applications in the other client devices can render the consequence and the game-altering impact in other instances of the multi-player game.

The method further comprises the steps of sending by the server, a valid notification to the first client device; receiving by the first client device, the valid notification; and rendering by the first client application, the game-altering impact in the first instance of the multi-player game; wherein there is a time lag between the rendering of the consequence and the rendering of the game-altering impact by the first client application in the first instance of the multi-player game, and wherein the effect of the time lag is reflected in the first instance of the multi-player game.

Preferably, the method further comprises the steps of determining by the server, that the consequence is invalid; sending by the server, a reinstate notification to the first client device; receiving by the first client device, the reinstate notification; and reinstating by the first client application, a state of the first instance of the multi-player game to one in which the consequence had never been rendered.

Preferably, the method further comprises the steps of determining by the server, that the game-altering impact is invalid; sending by the server, an invalid notification to the first client device; and receiving by the first client device, the invalid notification, which instructs the first client application not to render the game-altering impact in the first instance of the multi-player game.

Preferably, the step of determining by the server, that the consequence is valid, comprises the step of determining by the server, that the consequence satisfies a set of predefined conditions.

Preferably, the method further comprises the steps of calculating by the server, a correct consequence; sending by the server, the correct consequence to the first client device, so that the first client application can render the correct consequence in the first instance of the multi-player game; and disseminating by the server, the correct consequence to the other client devices, so that the client applications in the other client devices can render the correct consequence in the other instances of the multi-player game.

Preferably, the step of determining by the server, that the game-altering impact is valid, comprises the steps of calculating by the server, a correct game-altering impact; and determining by the server, that a variance between the game-altering impact and the correct game-altering impact falls within an acceptable threshold.

Preferably, the step of determining by the server, that the game-altering impact is valid, comprises the step of determining by the server, that the game-altering impact satisfies another set of predefined conditions.

Preferably, the method further comprises the steps of calculating by the server, a correct game-altering impact; sending by the server, the correct game-altering impact to the first client device, so that the first client application can render the correct game-altering impact in the first instance of the multi-player game; and disseminating by the server, the correct game-altering impact to the other client devices, so that the client applications in the other client devices can render the correct game-altering impact in the other instances of the multi-player game.

Preferably, the method further comprises the steps of receiving at the first client application, a command to perform a series of actions, the series of actions comprising a first action; sending by the first client device, an initialization data package to the server, the initialization data package indicating a start of the series of actions; calculating at the first client application, a first consequence of the first action; rendering by the first client application, the first consequence in the first instance of the multi-player game; determining by the first client application that the first consequence does not have a game-altering impact, and bypassing sending a first data package from the first client device to the server; and sending by the first client device, a finalization data package to the server, the finalization data package indicating an end to the series of actions.

Preferably, the series of actions is a sustained activation of a weapon, and the first action is a first activation of the weapon, and the first consequence is the shot missed a target, and the first data package contains data pertaining to the first activation of the weapon.

Preferably, if the action has an associated series of animation, the method comprises the steps of rendering by the first client application, the series of animation in the first instance of the multi-player game; sending another data package from the first client device to the server, the another data package comprising the action; receiving by the server, the another data package; disseminating by the server, the another data package to the other client devices, so that the client applications in the other client devices can render the series of animation in the other instances of the multi-player game; calculating by the server, a correct consequence of the action; calculating by the server, a correct game-altering impact of the consequence; sending by the server, the correct consequence and the correct game-altering impact to the first client device, so that the first client application can render the correct consequence and the correct game-altering impact in the first instance of the multi-player game; and disseminating by the server, the correct consequence and the correct game-altering impact to the other client devices, so that the client applications in the other client devices can render the correct consequence and the correct game-altering impact in the other instances of the multi-player game.

Preferably, the series of animation comprises an animation for a grenade being thrown, an animation for the grenade landing on a location, and an animation for the grenade exploding to cover a blast radius.

Preferably, the multi-player game is an online first person shooter (FPS) game.

Preferably, the first client device and the other client devices are mobile devices.

Other aspects of the invention will become clearer from the following detailed description of some preferred embodiments thereof.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

FIG. 3 depicts examples of actions and their possible consequences.

FIG. 6 depicts examples of consequences and their possible game-altering impacts.

Figure 1:
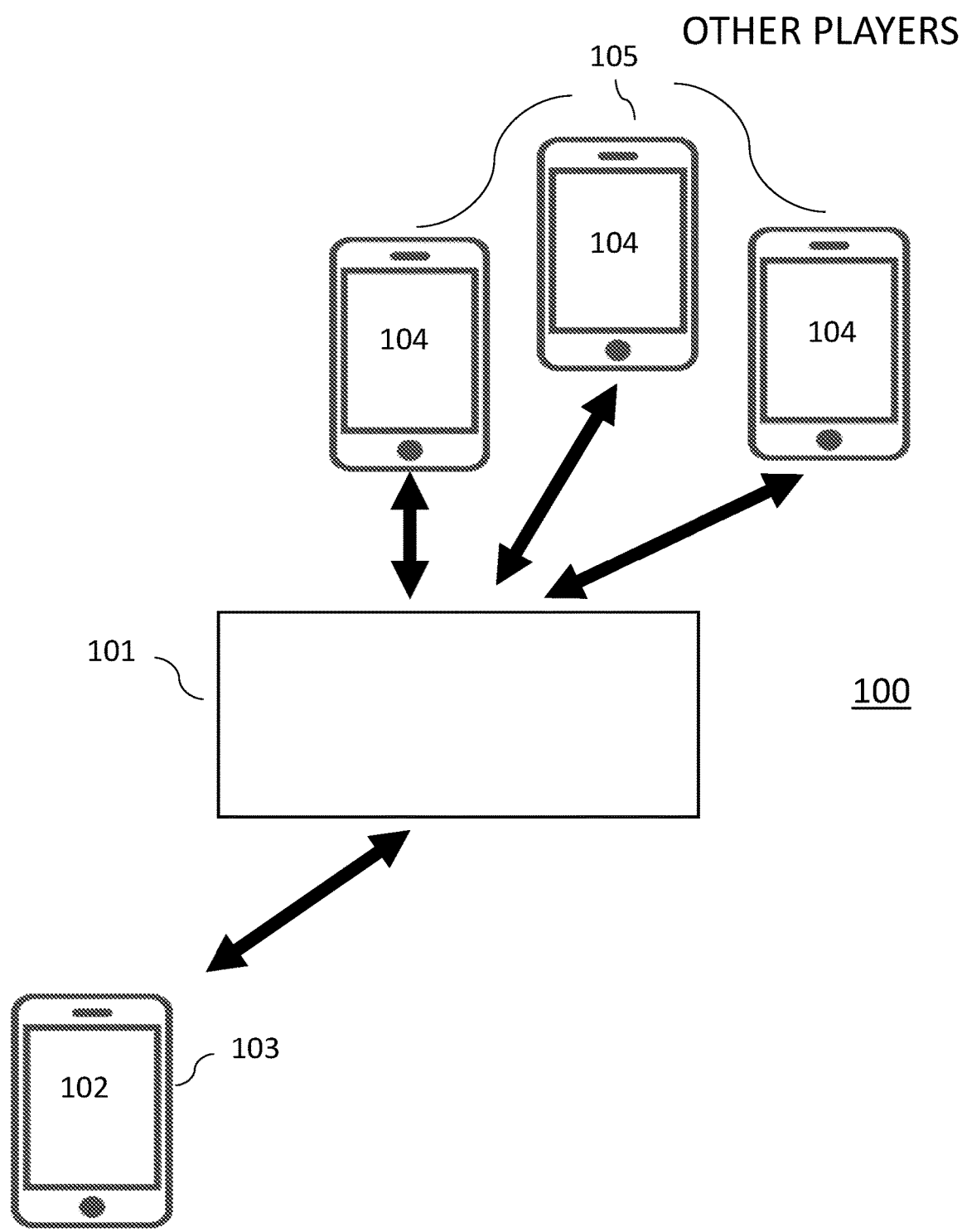
FIG. 1 depicts a system for implementing a multi-player game, while in accordance with certain embodiments.

Skilled artisans will appreciate that elements in the figures are illustrated for simplicity and clarity and have not necessarily been depicted to scale. For example, the dimensions of some of the elements in the block diagrams or steps in the flowcharts may be exaggerated relative to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a method for implementing a multi-player game, the method comprising the steps of launching by a client application on a client device, a first instance of the multi-player game; receiving at the client application, a command to perform an action; and calculating at the client application, a consequence of the action. The method also comprises the steps of rendering by the client application, the consequence in the first instance of the multi-player game; and sending a data package from the client device to a server, the data package comprising the action and the consequence.

The method further comprises the server checking whether the consequence is valid. If the server determines that the consequence is valid; the server will disseminate the data package to other client devices, so that client applications in the other client devices can render the consequence in other instances of the multi-player game. Wherein the step of the client application rendering the consequence in the first instance of the multi-player game is performed prior to the server determining that the consequence is valid.

If the server determines that the consequence is invalid, the server will send a reinstate notification to the client device. Upon receiving the reinstate notification by the client device, the client application will reinstate the state of the first instance of the multi-player game to one in which the consequence had never been rendered.

In essence, embodiments of the invention describe a method of collaborative gameplay whereby the consequence of a player's action is calculated and rendered by the client application of the client device of the instant player first. The checking of whether the consequence of the action is valid or not, is done by the server only after the consequence has already been rendered on the player's client device. After the server has determined that the consequence is valid, the server then disseminates the data package to the other client devices of other players participating in the multi-player game, so that the consequence can likewise be rendered on the other client devices, thereby synchronizing gameplay.

Because the client application of the client device is the one that calculates the consequence of the action, the client application does not need to wait for the server to compute the consequence of the action. Instead, the client application can immediately calculate and then render the consequence in the game after the player has provided the command to perform the action. This gives the impression that the game is extremely responsive and has very low latency, which improves the user experience.

Furthermore, as the client application can independently calculate and render the consequence of the action in the game, the client device does not need to send all the game data to the server. In specific instances, the client device can choose to omit sending certain game data to the server. Take for example, if the action is "activate weapon". As long as an initialization data package (sent when the weapon is first activated) and a final data package (sent when the weapon is no longer activated) are sent (for synchronization purposes), a data package does not need to be sent from the client device to the server when the consequence, as calculated by the client device, is that the shot missed the target.

To put it another way, in instances where the consequence of the action does not have a game-altering impact, or the consequence does not have an effect on the synchronization of the game, the client device can avoid sending data packages to the server during these instances. By not sending these "inconsequential" data packages, the overall data sent from the client device to the server can be advantageously reduced when compared to traditional methods.

Another advantage of the client device calculating the consequence and rendering the consequence independently of the server, is that the client device does not need to send data packages to the server at such a high frequency. For example, instead of sending a data package after every frame, the client device can send data packages to the server after every 5 frames, or after every 10 frames. In other words, the rate in which data packages is sent from the client device to the server can be less when compared to traditional methods. The frequency of data transfers can thus be advantageously reduced for embodiments of the present invention.

A possible disadvantage of embodiments of the invention may arise in the scenario where the server has determined the consequence of the action to be invalid. In such a scenario, the server sends a reinstate notification to the client device. Upon receiving the reinstate notification, the client application reinstates the state of the game to one in which the consequence had never been rendered. Yet, this act of reinstating can result in abrupt changes to the game which may affect the fluidly and seamlessness of the game, and make the gameplay appear disjointed. However, this is an acceptable compromise because the odds of this taking place frequently are low (unless the player is cheating), and is outweighed by the aforementioned advantages.

FIG. 1 depicts system 100 for implementing a multi-player game, while in accordance with certain embodiments. The multi-player game can be a first-person shooter (FPS) game. The multi-player game can be an online game. System 100 comprises server 101, client device 103 and other client devices 105. An instance of the game can be launched via client application 102 installed on client device 103. Likewise, instances of the game can be launched via client applications 104 installed on the other client devices 105. After the game instances have been launched, "player one" using client device 103 can engage in collaborative gameplay with "other players" using other client devices 105 as part of the multiplayer gaming functionality.

Server 101 is configured to engage in bidirectional communication with client device 103 and the other client devices 105. Client device 103 and the other client devices 105 can be, and are not limited to mobile devices, smart phones, personal computers, laptops, game consoles, and televisions.

Figure 2:
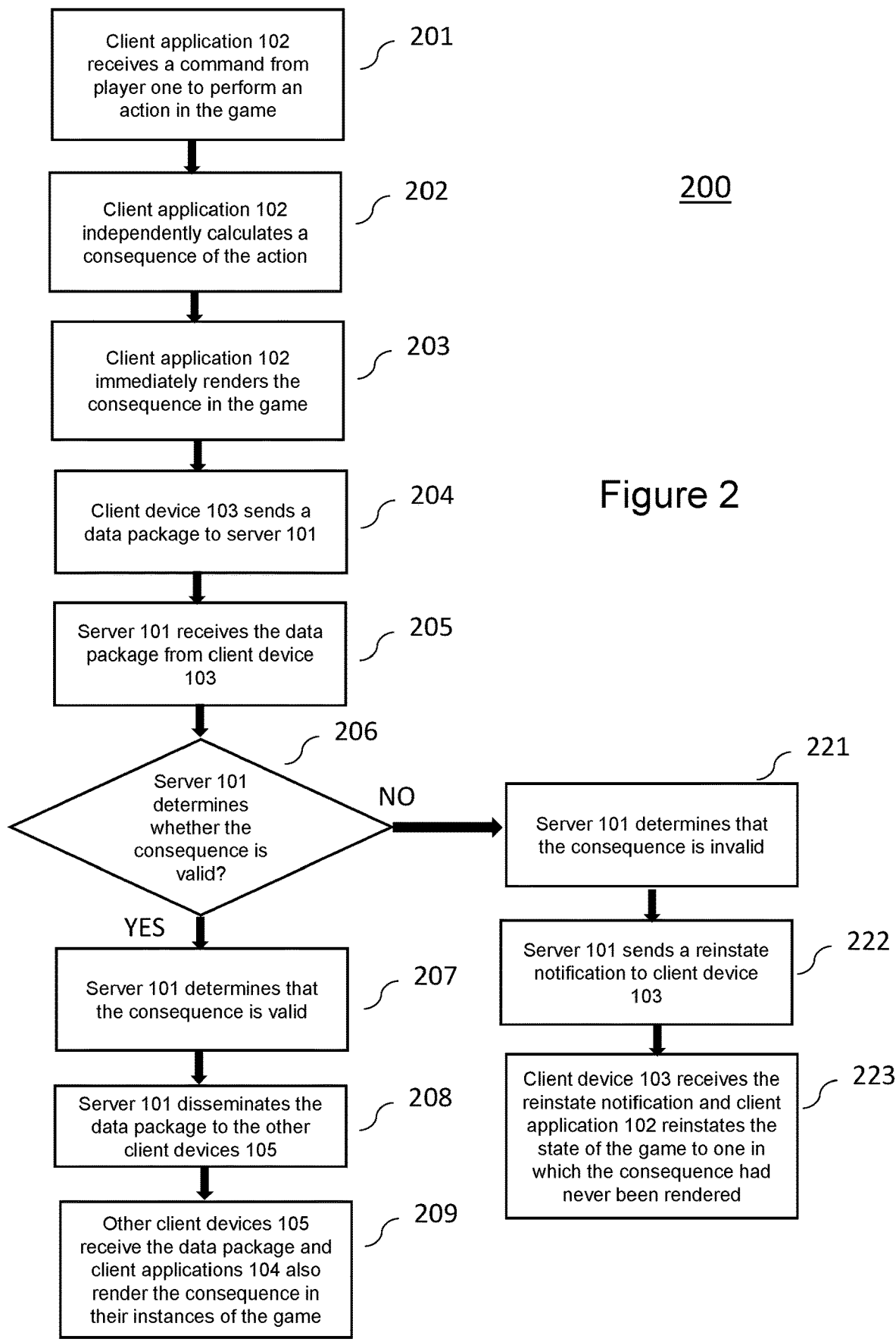
FIG. 2 depicts a method for implementing a multi-player game, while in accordance with certain embodiments.

FIG. 2 depicts a method 200 for implementing a multi-player game, while in accordance with certain embodiments. An instance of the game is launched by client application 102 installed on client device 103.

In step 201, client application 102 receives a command from player one to perform an action in the game. The action can be in relation to player one's avatar in the game. Examples of the action can be "move to the left" or "activate weapon". Exemplary examples of the action are also provided in FIG. 3. Player one can provide the command to client application 102 via any input medium on client device 103, for example, a touch screen, touchpad, keyboard, mouse, game controller etc.

In step 202, client application 102 independently calculates a consequence of the action. For example, if the action is "move to the left", client application 102 calculates that the consequence is "avatar is moved to position X". In another example, if the action is "activate weapon", client application 102 calculates that the consequence is "shot hit target T". In yet another example, if the action is "drive vehicle to the left", client application 102 calculates that the consequence is "vehicle is driven to position X". In yet another example, if the action is "weapon shift", client application 102 calculates that the consequence is "weapon is changed from weapon A to weapon B".

Client application 102 can calculate the consequence of the action using game data. Game data can, for example, include current position of avatar, type of weapons being carried by the avatar, position of target T etc.

In step 203, client application 102 immediately renders the consequence in the game. Client application 102 does not wait for approval or any input from server 101, but directly renders the consequence in the game. The accompanying visual and sound effects of the rendered consequence will also be produced. For example, client application 102 renders the consequence by shifting the avatar of player one from its original position to position X. In another example, client application 102 renders the consequence by providing visual and sounds effects to indicate that the shot hit target T. The visual effects could be that target T is wounded or bleeding from being shot. In yet another example, client application 102 renders the consequence by shifting the vehicle from its original position to position X. In yet another example, client application 102 renders the consequence by changing the weapon held by the avatar of player one from weapon A to weapon B.

In step 204, client device 103 sends a data package to server 101. The data package contains data pertaining to the action and the consequence. The data package can also comprise game data.

In step 205, server 101 receives the data package from client device 103.

In step 206, server 101 determines whether the consequence is valid. Server 101 can utilise the game data in the data package to make this determination.

In step 207, server 101 determines that the consequence is valid. Server 101 can determine that the consequence is valid if it satisfies a set of predefined conditions. For example, server 101 determines that position X for the avatar of player one is valid as there is no obstacle or wall in position X. In another example, server 101 determines that it is valid that the shot hit target T as the avatar of player one and target T are in close proximity. In yet another example, server 101 determines that position X for the vehicle is valid as there is no obstacle or wall in position X. In yet another example, server 101 determines that the weapon shift to weapon B is valid as the avatar of player one possesses weapon B.

In step 208, server 101 disseminates the data package to the other client devices 105.

In step 209, other client devices 105 receive the data package and client applications 104 also render the consequence in their instances of the game. Thus, the action performed by player one and the consequence of said action is synchronized across all the game instances in client device 103 and the other client devices 105, and the gameplay is synchronized for all the players playing in the multiplayer game.

In step 221, server 101 determines that the consequence is invalid. Server 101 can determine that the consequence is invalid if it does not satisfy a set of predefined conditions. For example, server 101 determines that position X for the avatar of player one is invalid as there is an obstacle or a wall in position X. In another example, server 101 determines that it is invalid that the shot hit target T as the avatar of player one and target T are out of range from one another. In yet another example, server 101 determines that position X for the vehicle is invalid as there is an obstacle or a wall in position X. In yet another example, server 101 determines that the weapon shift to weapon B is invalid as the avatar of player one does not have in its possession weapon B.

In step 222, server 101 sends a reinstate notification to client device 103.

In step 223, client device 103 receives the reinstate notification and client application 102 reinstates the state of the game to one in which the consequence had never been rendered. In other words, as server 101 deems the consequence to be invalid, server 101 instructs client application 102 to disregard the rendered consequence, and that the game should be reverted or "roll-backed" to a state in which the consequence had never been rendered.

For example, say that the action was "move to the left", and the client application 102 had already rendered the consequence by shifting the avatar of player one from its original position to position X in the game. Upon receiving the reinstate notification, client application 102 will immediately move the avatar of player one back to its original and previous position (i.e. the position of the avatar of player one at the time of receiving the command from player one to perform the action), to revert the state of the game to one in which the consequence had never been rendered.

In another example, say the action was "shot hit target T" and the client application 102 would have already rendered the consequence by providing visual effects to indicate that target T was wounded or bleeding from being shot. Upon receiving the reinstate notification, client application 102 will immediately cease any visual effects to indicate that target T had been hit by that shot, so as to revert the state of the game to one in which the consequence had never been rendered.

In yet another example, say the action was "drive vehicle to the left" and the client application 102 would have already rendered the consequence by shifting the vehicle from its original position to position X in the game. Upon receiving the reinstate notification, client application 102 will immediately move the vehicle back to its original and previous position (i.e. the position of the vehicle at the time of receiving the command from player one to perform the action), to revert the state of the game to one in which the consequence had never been rendered.

In yet another example, say the action was "weapon shift" and the client application 102 would have already rendered the consequence by changing the weapon held by the avatar of player one from weapon A to weapon B. Upon receiving the reinstate notification, client application 102 will immediately change the weapon held by the avatar of player one from weapon B back to weapon A, to revert the state of the game to one in which the consequence had never been rendered.

As the consequence has been determined to be invalid by server 101, server 101 does not disseminate the data package to the other client devices 105.

Therefore, embodiments of the invention describe that the consequence of the action is calculated by client application 102 on client device 103, and independently of server 101. After the calculation, client application 102 immediately renders the consequence in the game, before any verification or validation of the consequence by server 101.

There are number of advantages attributable to this novel approach. Firstly, as client application 102 is the one that calculates the consequence of the action, client application 102 does not need to wait for server 101 to compute and provide the consequence of the action. Instead, client application 102 can immediately calculate and render the consequence in the game after player one has provided the command to perform the action. This gives the impression that the game is extremely responsive and has very low latency, which greatly improves the user experience.

Furthermore, as client application 102 can independently calculate and render the consequence of the action in the game, client device 103 does not need to send all the game data to server 101. In specific instances, client device 103 can be selective and choose to omit sending certain game data to server 101. Take for example, if the action is "activate weapon". As long as an initialization data package (sent when the weapon is first activated) and a finalization data package (sent when the weapon is no longer activated) are sent (for synchronization purposes), a data package does not need to be sent from client device 103 to server 101 each time the consequence, as calculated by the client device, is such that the shot missed the target.

To put it another way, in instances where the consequence of the action does not have a game-altering impact, or the consequence of the action does not have an effect on the synchronization of the game, client device 103 can avoid sending these data packages to server 101. By not sending these "inconsequential" data packages, the overall data sent from client device 103 to server 101 can be advantageously reduced when compared to traditional methods.

Figure 4:
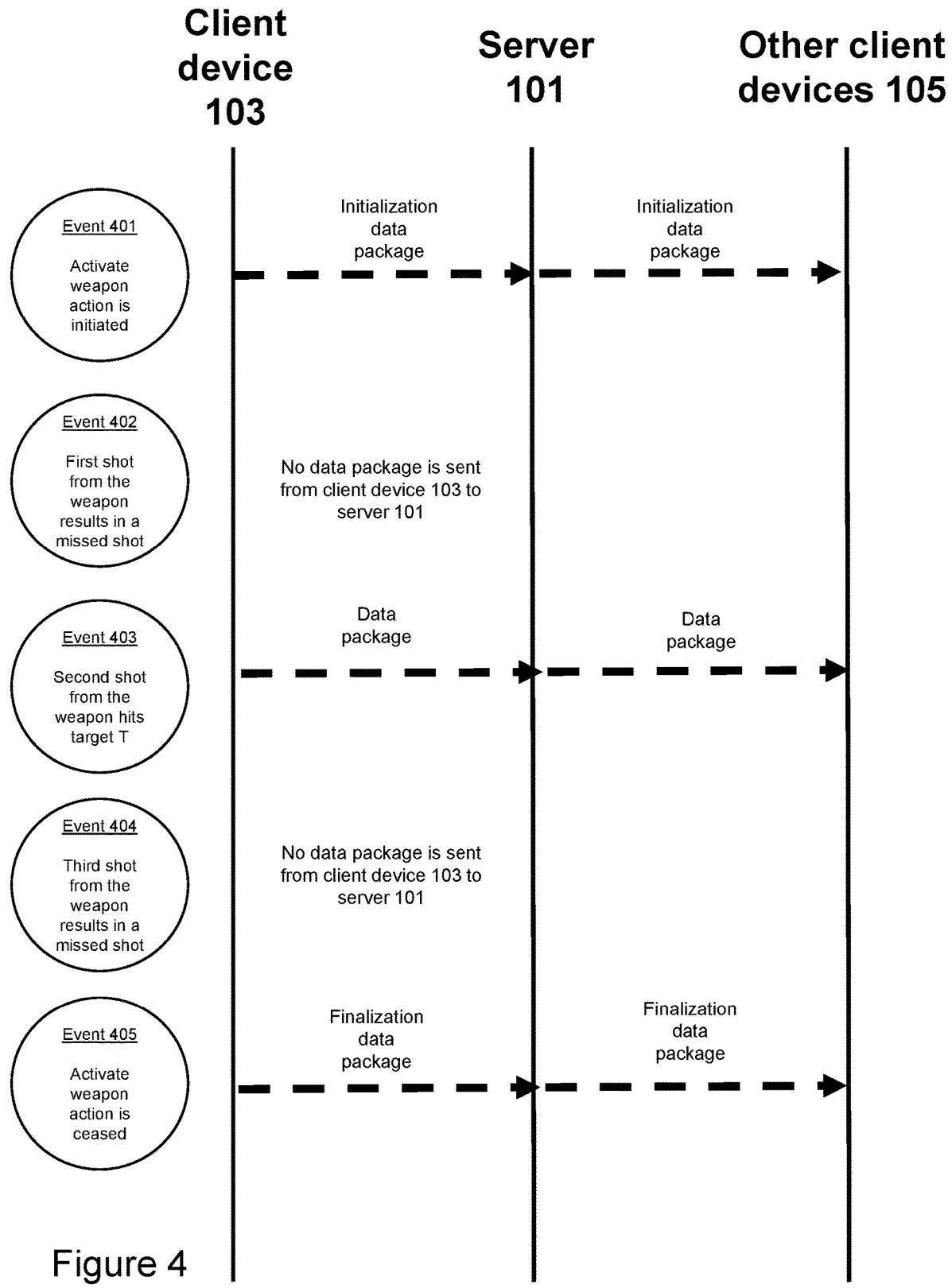
FIG. 4 depicts the reduced data transmissions between the client device and the server, while in accordance with certain embodiments.

This is elaborated and demonstrated in the chart of FIG. 4, which depicts the reduced data transmissions between client device 103 and server 101, while in accordance with certain embodiments. In this illustration, the action is "activate weapon" and the input command by player one is sustained i.e. player one holds onto the firing button for a period which results in a series of actions (first action, second action, third action etc.).

At event 401, the activate weapon action is initiated. Client device 103 sends an initialization data package to server 101 for event 401. The initialization data package can comprise game data like the weapon ID of the weapon used by the avatar of player one, and the timestamp of when the activate weapon action was initiated. Server 101 receives, and then disseminates the initialization data package to the other client devices 105 so that the initialization of the activate weapon action is synchronized across all the game instances in the other client devices 105.

At event 402, the first shot from the weapon is fired (i.e. first action). Client device 103 determines that the consequence of the first action is that the "Shot missed target T". As the consequence of this first action does not have a game-altering impact, and does not have an effect on the synchronization of the game, client device 103 does not send any data package to server 101 for event 402. Thus, server 101 will not disseminate any data packages to other client devices 105 for event 402.

At event 403, the second shot from the weapon is fired (i.e. second action). Client device 103 determines that the consequence of the second action is that the "Shot hit target T". Client device 103 sends a data package to server 101 for event 403. The data package can comprise game data like the weapon ID of the weapon used by the avatar of player one, current position and direction of the avatar, the coordinates of target T, ID of target T, target area, damage, scatter value of the cross hair, and current number of shots (i.e. second shot).

Server 101 receives and then disseminates the data package to the other client devices 105 so that the hitting of target T on the second shot is synchronized across all the game instances in the other client devices 105.

At event 404, the third shot from the weapon is fired (i.e. third action). Client device 103 determines that the consequence of the third action is that the "Shot missed target T". As the consequence of this third action does not have a game-altering impact, and does not have an effect on the synchronization of the game, client device 103 does not send any data package to server 101 for event 404. Thus, server 101 will not disseminate any data packages to other client devices 105 for event 404.

At event 405, the activate weapon action is ceased (i.e. player releases the firing button). Client device 103 sends a finalization data package to server 101 for event 405. The finalization data package can comprise game data like the ammunition consumed. Server 101 receives and then disseminates the finalization data package to the other client devices 105 so that the ceasing of the activate weapon action is synchronized across all the game instances in the other client devices 105.

As demonstrated in FIG. 4, embodiments of the invention can result in reduced data transmissions between client device 103 and server 101. As client application 102 can independently calculate that the first and third shots miss target T, and therefore do not result in any game-altering impacts, client device 103 can avoid (or bypass) sending data packages to server 101 for events 402, 404, and advantageously mitigate data transmissions between client device 103 and server 101. The ripple effect is that data transmissions between server 101 and the other client devices 105 will also be advantageously reduced.

The synchronization of the game will also not be affected. This is because the other client devices 105 will receive the initialization data package (which has information of when shooting begins and the type of weapon and thus the firing rate of the weapon) and the finalization data package. Thus, client applications 104 in the other client devices 105 will know when to render the visual and sound effects of the first and third shots, even when no data packages are being sent to them for event 402 and event 404. By not sending "inconsequential" data packages, the overall data sent from client device 103 to server 101 can be advantageously reduced when compared to traditional methods, which in this scenario, will otherwise have to send data packages for all events 401, 402, 403, 404 and 405.

Another advantage of client application 102 of client device 103 calculating the consequence and rendering the consequence in the game independently of server 101, is that client device 103 does not need to send data packages to server 101 at such a high frequency. For example, instead of sending a data package after every frame, client device 103 can send data packages to server 101 after every 5 frames, or after every 10 frames instead. In other words, the rate in which data packages is sent from client device 103 to server 101 can be less than traditional methods. Thus, the frequency of the data transfers from client device 103 to server 101 can be advantageously reduced for embodiments of the present invention.

A possible disadvantage of embodiments of the invention can surface in the scenario where server 101 has deemed the consequence of the action to be invalid (steps 221, 222 and 223 in FIG. 2). In this scenario, server 101 sends a reinstate notification to client device 103, causing client application 102 to reinstate the state of the game to one in which the consequence had never been rendered. The act of reinstating by client application 102 can result in abrupt changes to the game (i.e. moving the avatar of player one back to the original position) which may affect the fluidly and seamlessness of the game in those instances, and make the gameplay appear disjointed. However, this is an acceptable compromise because the odds of this taking place frequently are low (unless the player is cheating), and is outweighed by the aforementioned advantages.

Consequences may or may not have a game-altering impact. A consequence has a game-altering impact when the consequence has an influence on the result of the game. This influence can be for example, decreasing hit points of target T, decreasing hit points of the avatar of player one, death of target T, or death of the avatar of player one etc. Therefore, a shot hitting target T can have the game-altering impact of decreasing target T's health by 20 hit points, or driving a vehicle to position X can have the game-altering impact of decreasing target T's health by 30 hit points (as target T is on position X), or moving the avatar of player one to position X where there is an electric fence, can have the game-altering impact of decreasing the avatar of player one's health by 10 hit points.

A consequence does not have a game-altering impact when the consequence does not have any influence on the result of the game. Examples can be a shot missing target T, or when the vehicle is driven to position X and there is no target or obstacle in position X. FIG. 6 depicts some examples of consequences and their possible game-altering impacts.

Figure 5:
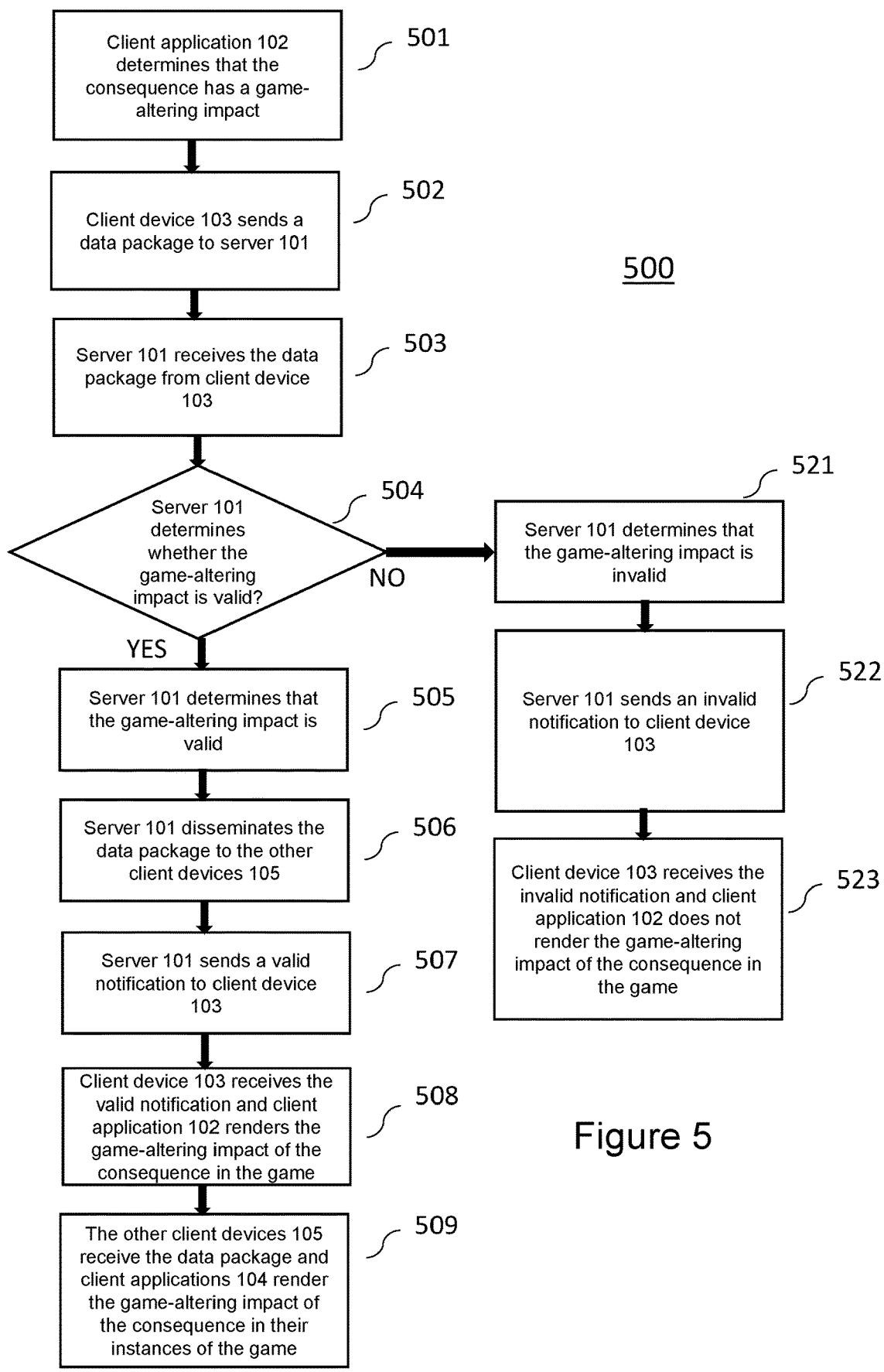
FIG. 5 depicts the additional steps to the method of FIG. 2, in catering to scenarios where the consequence has a game-altering impact, while in accordance with certain embodiments.

Method 500 in FIG. 5 depicts additional steps to method 200, to cater to scenarios where the consequence has a game-altering impact, while in accordance with certain embodiments.

In step 501, client application 102 determines that the consequence has a game-altering impact. Client application 102 can utilize the game data to make this determination. For example, client application 102 determines that moving avatar of player one to position X will result in decreasing the avatar of player one's hit points by 10 hit points (for example due to a barbed wire or electric fence in position X). In another example, client application 102 determines that the shot hitting target T will decrease target T's hit points by 20 hit points. In yet another example, client application 102 determines that moving vehicle to position X will result in decreasing target T's hit points by 30 hit points (for example, target T is on position X).

It is important to note that even though client application 102 has already determined the game-altering impact of the consequence, client application 102 does not render the game altering impact in the game as yet, but holds off on this. Instead, in step 502, client device 103 sends a data package to server 101. This data package is similar to the data package sent in step 204 of FIG. 2, in that this data package also contains data pertaining to the action and the consequence, and the game data. However, this data package additionally comprises the game altering impact of the consequence which had been determined by client application 102.

In step 503, server 101 receives the data package from client device 103.

In step 504, server 101 determines whether the game-altering impact is valid. Server 101 can utilise the data pertaining to the action and the consequence, and the game data in the data package to make this determination. Server 101 can determine that the game-altering impact is valid or invalid by assessing whether the game-altering impact satisfies a set of predefined conditions. For example, if the game-altering impact is to decrease target T's health by 20 hit points, but server 101 assesses that the maximum possible damage that can be inflicted by the current weapon held by the avatar of player one is only 10 hit points, server 101 will determine the game-altering impact to be invalid. Conversely, if server 101 assesses that the damage of 20 hit points is well within the maximum possible damage that can be inflicted by the current weapon held by the avatar of player one, server 101 will determine the game-altering impact to be valid.

Alternatively, server 101 can determine whether the game-altering impact is valid or invalid by calculating the "correct" game-altering impact, and then checking whether the variance between the game-altering impact (as determined by the client device 103) and the correct game-altering impact falls within an acceptable threshold. If the variance between the game-altering impact (as determined by the client device 103) and the correct game-altering impact falls within an acceptable threshold, server 101 determines that the game-altering impact is valid. Conversely, if the variance between the game-altering impact (as determined by the client device 103) and the correct game-altering impact falls outside of the acceptable threshold, server 101 determines that the game-altering impact is invalid.

The difference between the two methods is that it may be computationally faster for server 101 to check whether the game-altering impact (as determined by the client device 103) satisfies a set of predefined conditions, than to perform an independent calculation to determine the correct game-altering impact.

In step 505, server 101 determines that the game-altering impact is valid.

In step 506, server 101 disseminates the data package to the other client devices 105.

In step 507, server 101 sends a valid notification to client device 103. This valid notification is to instruct client application 102 to render the game-altering impact of the consequence in the game.

Steps 506 and 507 can be performed concurrently or one after another. Alternatively, step 507 can be performed before step 506.

In step 508, client device 103 receives the valid notification and client application 102 renders the game-altering impact of the consequence in the game. For example, client application 102 will render in the game that target T's health has decreased by 20 hit points.

In step 509, the other client devices 105 receive the data package and client applications 104 also render the game-altering impact of the consequence in their instances of the game. For example, client applications 104 will render in their instance of the game that target T's health has decreased by 20 hit points.

After steps 508 and 509, the action performed by player one, the consequence of said action and its game-altering impact, would be synchronized across all the game instances in client device 103 and the other client devices 105.

In step 521, server 101 determines that the game-altering impact is invalid.

In step 522, server 101 sends an invalid notification to client device 103.

In step 523, client device 103 receives the invalid notification and client application 102 does not render the game-altering impact of the consequence in the game.

Therefore, embodiments of the invention describe that client application 102 does not render the game-altering impact of the consequence without first obtaining validation or approval from server 101. This is due to the significance of the game-altering impact, which will have an influence on the result of the game. As this will be the focal point for any cheating, the game-altering impact of the consequence needs to be verified or approved by server 101, before it can be rendered in the game.

In scenarios where server 101 determines that the game-altering impact is invalid, server 101 does not disseminate the data package to the other client devices 105. If client application 102 determines that the consequence does not have a game-altering impact, method 500 will not be performed.

In summary, embodiments of the invention describe that client application 102 of client device 103 immediately renders the consequence of the action in the game, without first obtaining any verification or approval from server 101. However, if the consequence has a game-altering impact, client application 102 will wait to receive a verification or approval from server 101 first, before rendering the game-altering impact of the consequence in the game. Consequently, there will be a time lag between the rendering of the consequence, and the rendering of the game-altering impact by client application 102 in the game.

Figure 7A:
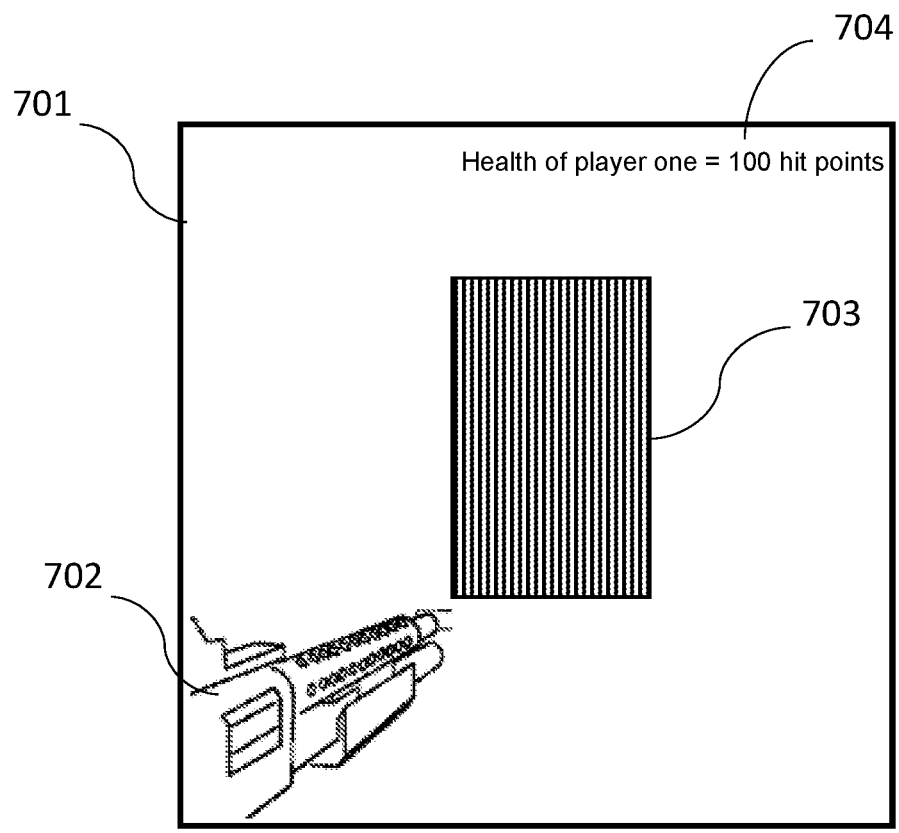
FIGS. 7(a) to 7(c) are a time series of figures depicting a time lag between the rendering of the consequence and the game-altering impact by the client application in the game.
Figure 7B:
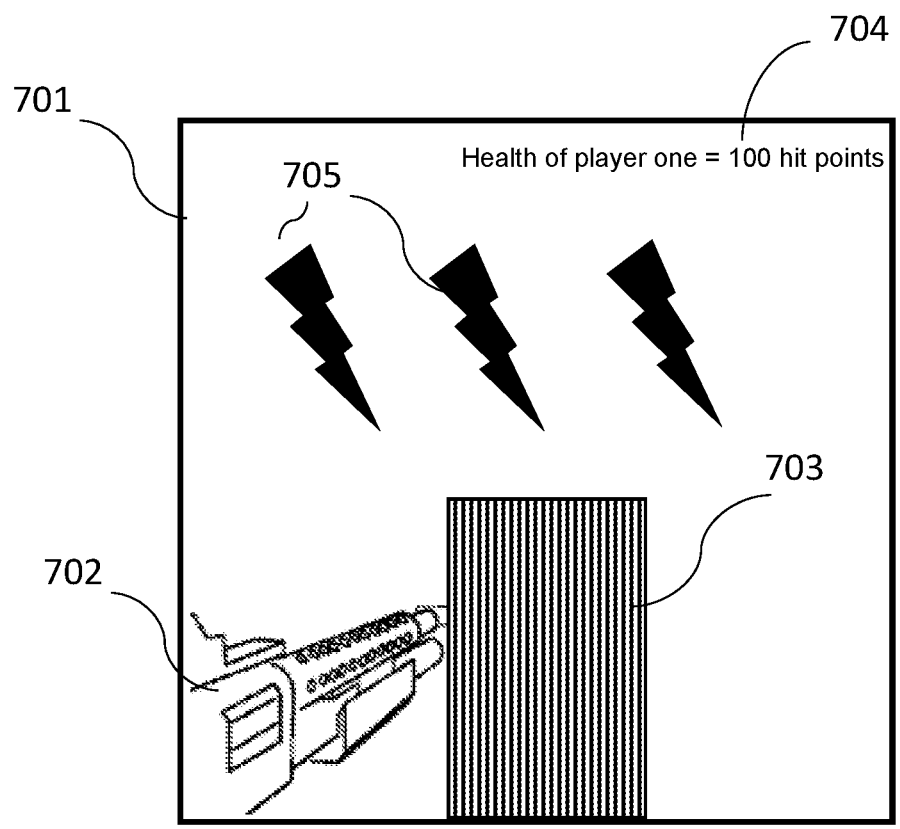
Figure 7C:
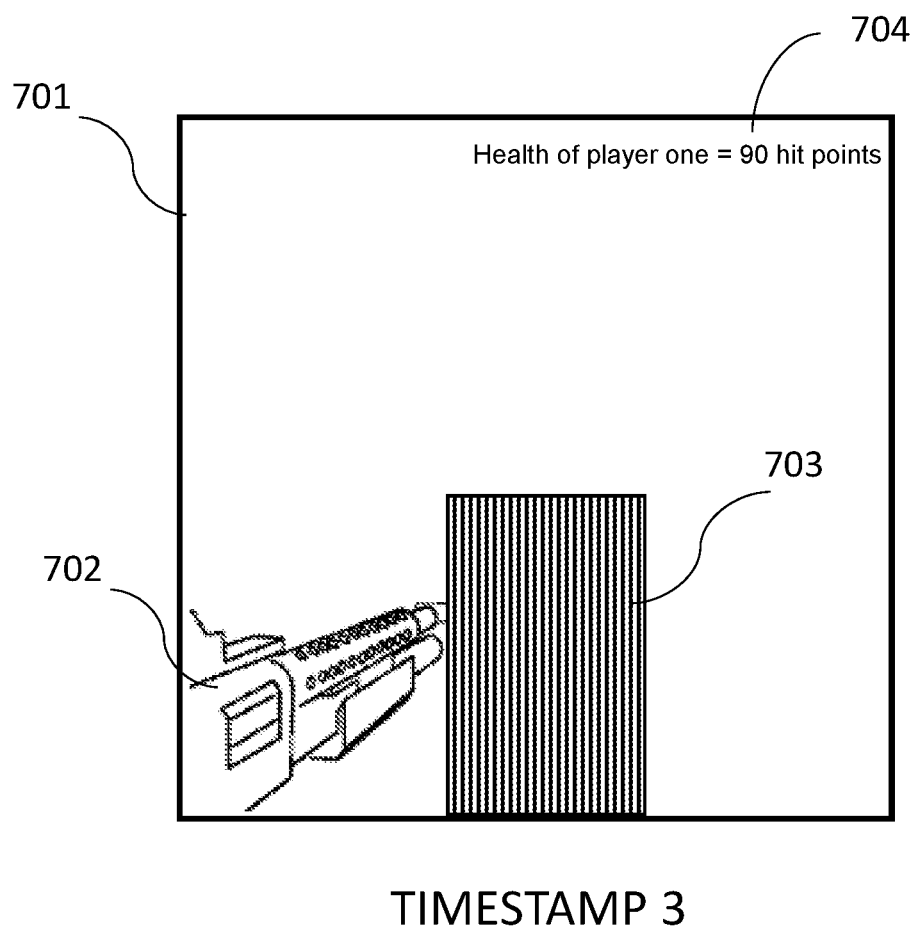

FIGS. 7(a) to 7(c) are a time series of figures which depict the time lag between the rendering of the consequence and the game-altering impact of the consequence by client application 102 in the game. FIG. 7(a) shows the display screen 701 of client device 103 running the game at timestamp 1. Display screen 701 displays a first person view of the virtual environment of the game. The virtual environment comprises weapon 702 of the avatar of player one, electric fence 703, and health bar 704 of the avatar of player one. At timestamp 1, player one inputs a command for the move forward action.

FIG. 7(*b*) shows the display screen 701 of client device 103 running the game at timestamp 2. Client application 102 has determined that the consequence of the moving forward action would be moving the avatar of player one to a position that contacts electric fence 703, and that the game-altering impact would be a damage of 10 hit points to the avatar of player one as a result of being electrocuted by electric fence 703.

At timestamp 2, client application 102 immediately renders the consequence of the action in the game, without first obtaining any verification from server 101. As shown in FIG. 7(*b*), the avatar of player one contacts electric fence 703. Client application 102 can also render dramatic effects such as lightning bolts 705 in the game to indicate that the avatar of player one is being electrocuted by electric fence 703. However, at timestamp 2, health bar 704 still indicates that the health of the avatar of player one has not yet been impacted (i.e. still at 100 hit points). This is because at timestamp 2, client device 103 has not yet received the valid notification from server 101 to render the game-altering impact of the consequence.

FIG. 7(*c*) shows the display screen 701 of client device 103 running the game at timestamp 3. At timestamp 3, client device 103 receives the valid notification to render the game-altering impact of the consequence, and client application 102 renders the game-altering impact in the game by deducting 10 hit points from heath bar 704 to reflect the damage to the avatar of player one.

In previously described embodiments of the invention, server 101 only does validation and verification of the consequence and game-altering impact but stops short of performing any independent recalculation to determine the correct consequence, and sending the correct consequence and correct game-altering impact to client device 103. This is because it is computationally faster for server 101 to check whether the consequence is valid, than to perform an independent calculation of the consequence.

Figure 9A:
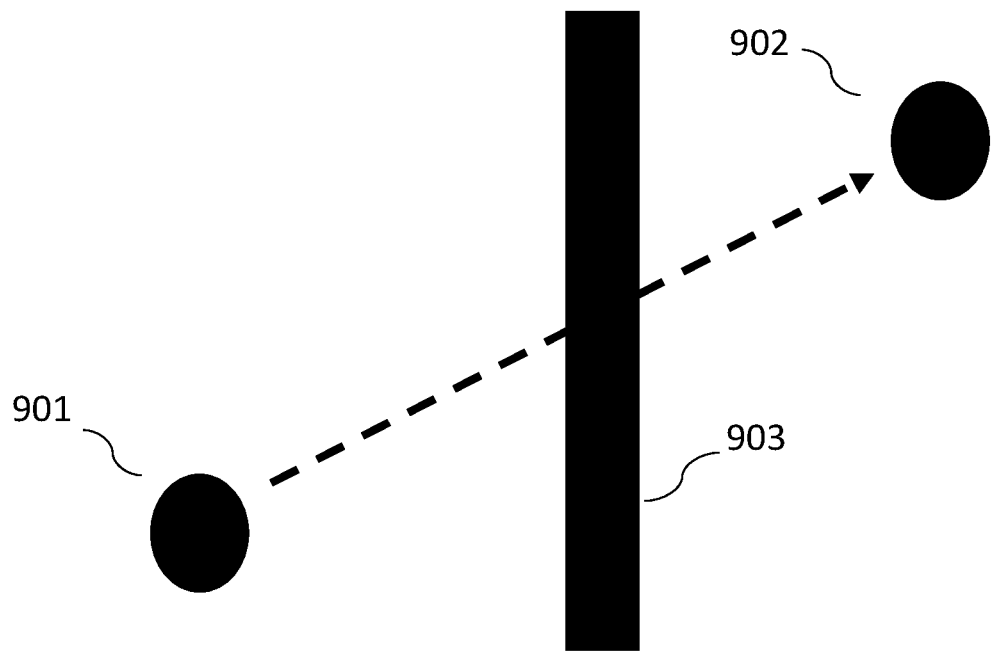
FIGS. 9(a) and 9(b) depicts the calculation of a correct consequence of an action by a server, while in accordance with certain embodiments.
Figure 9B:
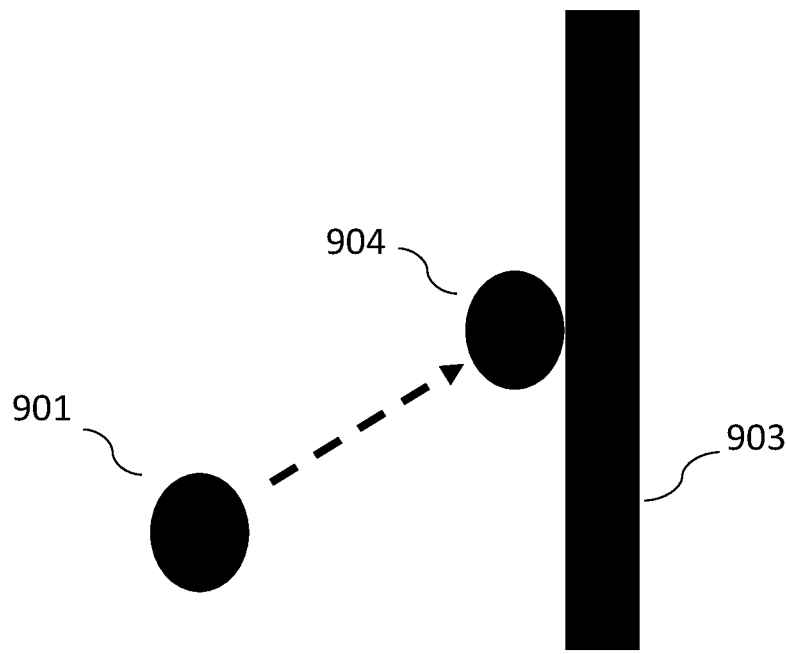

In certain embodiments of the invention however, when either the consequence or game-altering impact are found to be invalid, server 101 performs an independent calculation to determine the correct consequence and the correct game-altering impact. For example, as shown in FIG. 9(*a*), client application 102 determines that the consequence of a moving action is that the avatar of the player will be shifted from its original position 901 to new position 902.

However, server 101 determines that the consequence (i.e. new position 902) is invalid due to obstacle 903 blocking the path between original position 901 and new position 902. Server 101 calculates the correct consequence and determines it to be correct position 904 (see FIG. 9(*b*)). Server 101 then sends the correct consequence (correct position 904) to client device 103 and the other client devices 105 so that the correct consequence can be rendered across all game instances in the multiplayer game.

In a similar manner, server 101 determines that the game-altering impact is invalid. For example, if the game-altering impact is to decrease target T's health by 20 hit points, but server 101 assesses that the maximum possible damage that can be inflicted by the current weapon held by the avatar of player one is only 10 hit points. Server 101 calculates the correct game-altering impact and determines it to be a damage of 5 hit points to target T's health. Server 101 then sends the correct game-altering impact (damage of 5 hit points to target T's health) to client device 103 and the other client devices 105 so that the correct game-altering impact can be rendered across all game instances in the multiplayer game.

Certain actions may require elaborate effects to be rendered in order to virtualize the action. An example of such an action is "throw grenade". In order to virtualize a grenade being thrown in the game, landing on a location, and then exploding; a series of animation may need to be rendered. This series of animation may have a duration and require some time to complete.

Once a "throw grenade" action has been performed by player one, client application 102 will render the series of animation to virtualize the "throw grenade" action. This series of animation can include an animation for the grenade being thrown, an animation for the grenade landing on a location, and an animation for the grenade exploding to cover a blast radius. As mentioned, this series of animation may take some time to complete (for example, 1 or 2 seconds).

Certain embodiments of the invention can capitalise on this "time period" (i.e. time taken for the series of animation to complete), and have server 101 calculate both the consequence of the action and the game-altering impact (and client application 102 neither calculates the consequence of the action nor calculates the game-altering impact). The reason for this is that in an ideal world, and to completely guarantee that there is no cheating whatsoever, server 101 should be the one calculating all consequences and all game-altering impacts. However, as described in some of the previous embodiments (e.g. FIG. 2), client application 102 calculates the consequence and the game-altering impact, with server 101 playing the role of "a verifier", so as to find the right balance between game responsiveness and fair play.

Figure 8:
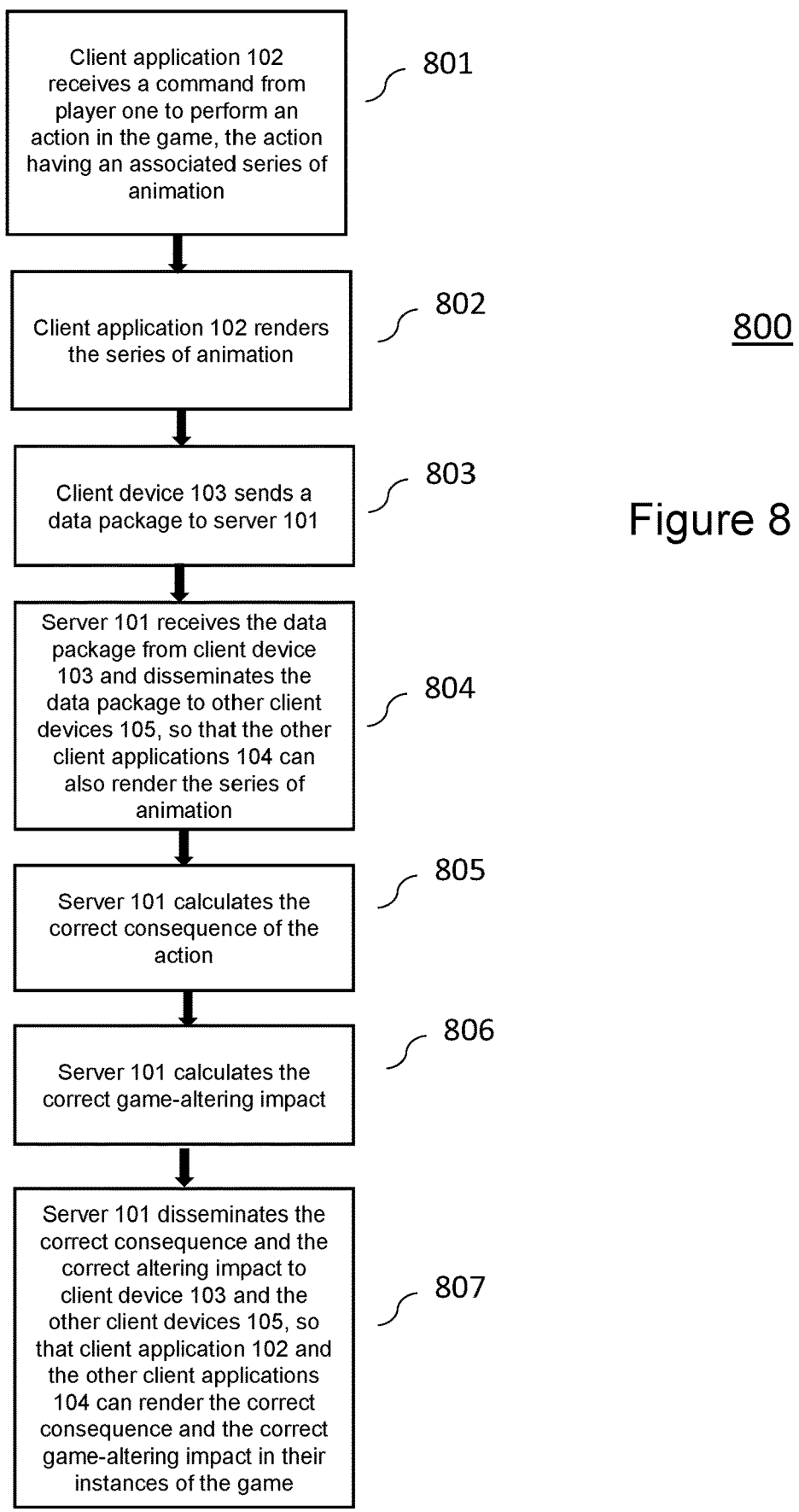
FIG. 8 depicts a method for implementing a multi-player game, when an action has an associated series of animation, while in accordance with certain embodiments.

There are exceptions, whereby if the action has an associated series of animation which may take some time to complete, server 101 calculates both the consequence of the action and the game-altering impact (and client application 102 neither calculates the consequence of the action nor calculates the game-altering impact), and server 101 provides both the consequence of the action and the game-altering impact to client device 102 and other client devices 105. FIG. 8 depicts a method 800 which details the steps performed in these embodiments.

In step 801, client application 102 receives a command from player one to perform an action in the game, the action having an associated series of animation. For example, the action can be a "throw grenade" action, and the series of animation can include an animation for the grenade being thrown, an animation for the grenade landing on a location, and an animation for the grenade exploding to cover a blast radius.

In step 802, client application 102 renders the series of animation.

In step 803, client device 103 sends a data package to server 101, the data package containing data pertaining to the action, for example, data pertaining to the "throw grenade" action.

Steps 802 and 803 can be done in any sequence. They can also be done simultaneously, or substantially simultaneously one after another.

In step 804, server 101 receives the data package from client device 103 and disseminates the data package to other client devices 105, so that the other client applications 104 can also render the series of animation.

In step 805, server 101 calculates the correct consequence of the action. For example, server 101 calculates that the correct consequence of the "throw grenade" action is that "target T1 and target T2 are damaged by the grenade".

In step 806, server 101 calculates the correct game-altering impact of the consequence. For example, server 101 calculates that the correct game-altering impact is that 10 hit points is to be reduced from target T1, and that 20 hit points is to be reduced from target T2.

In step 807, server 101 disseminates the correct consequence and the correct game-altering impact to client device 103 and the other client devices 105, so that client application 102 and the other client applications 104 can render the correct consequence and the correct game-altering impact in their instances of the game. Therefore, these embodiments take advantage of the "window of time" created by the series of animation associated with the particular action, and rely on server 101 to calculate both the consequence of the action and the game-altering impact, and to disseminate them to client device 103 and the other client devices 105, and thereby guaranteeing that, at least for that particular action, there can be no cheating whatsoever.

The present invention may be implemented in a game that may be operable using a variety of devices or game systems. For example, a device may be a personal computer, a home entertainment system, a portable gaming device, or a mobile computing device. The present methodologies described herein are fully intended to be operable on a variety of devices or game systems. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, are intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for implementing a multi-player game comprising the steps of:
    launching by a first client application on a first client device, a first instance of the multi-player game;
    receiving at the first client application, a command to perform an action;
    calculating at the first client application, a consequence of the action;
    rendering by the first client application, the consequence in the first instance of the multi-player game;
    determining by the first client application, that the consequence has a game-altering impact;
    sending a data package from the first client device to a server, the data package comprising the action, the consequence, and the game-altering impact;
    receiving by the server, the data package;
    determining by the server, that the consequence is valid;
    determining by the server, that the game-altering impact is valid;
    disseminating by the server, the data package to other client devices, so that client applications in the other client devices can render the consequence and the game-altering impact in other instances of the multi-player game;
    sending by the server, a valid notification to the first client device;
    receiving by the first client device, the valid notification; and
    rendering by the first client application, the game-altering impact in the first instance of the multi-player game;
    wherein there is a time lag between the rendering of the consequence and the rendering of the game-altering impact by the first client application in the first instance of the multi-player game, and wherein the effect of the time lag is reflected in the first instance of the multi-player game.

2. The method of claim 1 further comprising the steps of:
    determining by the server, that the consequence is invalid;
    sending by the server, a reinstate notification to the first client device;
    receiving by the first client device, the reinstate notification; and
    reinstating by the first client application, a state of the first instance of the multi-player game to one in which the consequence had never been rendered.

3. The method of claim 2 further comprising the steps of:
    calculating by the server, a correct consequence;
    sending by the server, the correct consequence to the first client device, so that the first client application can render the correct consequence in the first instance of the multi-player game; and
    disseminating by the server, the correct consequence to the other client devices, so that the client applications in the other client devices can render the correct consequence in the other instances of the multi-player game.

4. The method of claim 1 further comprising the steps of:
  determining by the server, that the game-altering impact is invalid;
  sending by the server, an invalid notification to the first client device; and
  receiving by the first client device, the invalid notification, which instructs the first client application not to render the game-altering impact in the first instance of the multi-player game.

5. The method of claim 4 further comprising the steps of:
  calculating by the server, a correct game-altering impact;
  sending by the server, the correct game-altering impact to the first client device, so that the first client application can render the correct game-altering impact in the first instance of the multi-player game; and
  disseminating by the server, the correct game-altering impact to the other client devices, so that the client applications in the other client devices can render the correct game-altering impact in the other instances of the multi-player game.

6. The method of claim 1 wherein the step of determining by the server, that the consequence is valid comprises the step of:
  determining by the server, that the consequence satisfies a set of predefined conditions.

7. The method of claim 1 wherein the step of determining by the server, that the game-altering impact is valid, comprises the steps of:—
  calculating by the server, a correct game-altering impact; and
  determining by the server, that a variance between the game-altering impact and the correct game-altering impact falls within an acceptable threshold.

8. The method of claim 1 wherein the step of determining by the server, that the game-altering impact is valid, comprises the step of:—
  determining by the server, that the game-altering impact satisfies another set of predefined conditions.

9. The method of claim 1 further comprising the steps of:
  receiving at the first client application, a command to perform a series of actions, the series of actions comprising a first action;
  sending by the first client device, an initialization data package to the server, the initialization data package indicating a start of the series of actions;
  calculating at the first client application, a first consequence of the first action;
  rendering by the first client application, the first consequence in the first instance of the multi-player game;
  determining by the first client application that the first consequence does not have a game-altering impact, and bypassing sending a first data package from the first client device to the server; and
  sending by the first client device, a finalization data package to the server, the finalization data package indicating an end to the series of actions.

10. The method of claim 9 wherein the series of actions is a sustained activation of a weapon, and the first action is a first activation of the weapon, and the first consequence is the shot missed a target, and the first data package contains data pertaining to the first activation of the weapon.

11. The method of claim 1 wherein if the action has an associated series of animation, the method comprises the steps of:
  rendering by the first client application, the series of animation in the first instance of the multi-player game;
  sending another data package from the first client device to the server, the another data package comprising the action;
  receiving by the server, the another data package;
  disseminating by the server, the another data package to the other client devices, so that the client applications in the other client devices can render the series of animation in the other instances of the multi-player game;
  calculating by the server, a correct consequence of the action;
  calculating by the server, a correct game-altering impact of the consequence;
  sending by the server, the correct consequence and the correct game-altering impact to the first client device, so that the first client application can render the correct consequence and the correct game-altering impact in the first instance of the multi-player game; and
  disseminating by the server, the correct consequence and the correct game-altering impact to the other client devices, so that the client applications in the other client devices can render the correct consequence and the correct game-altering impact in the other instances of the multi-player game.

12. The method of claim 11 wherein the series of animation comprises an animation for a grenade being thrown, an animation for the grenade landing on a location, and an animation for the grenade exploding to cover a blast radius.

13. The method of claim 1 wherein the multi-player game is an online first person shooter (FPS) game.

14. The method of claim 1 wherein the first client device and the other client devices are mobile devices.

* * * * *